Aug. 24, 1948.   C. ADLER   2,447,889
SINE ANGLE PLATE
Filed Jan. 31, 1945   2 Sheets-Sheet 1
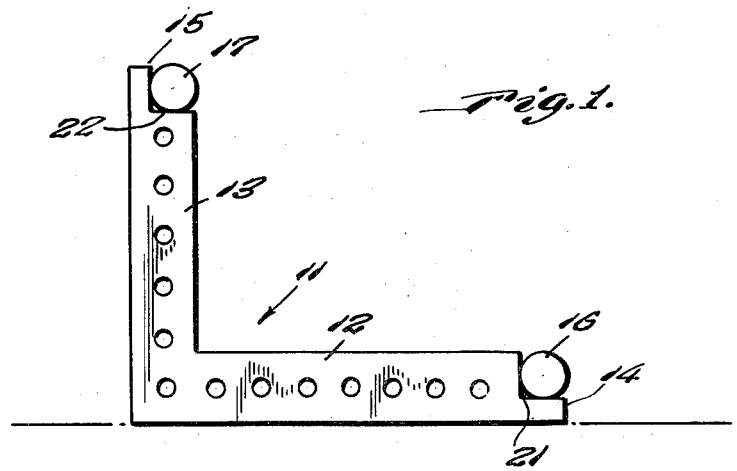
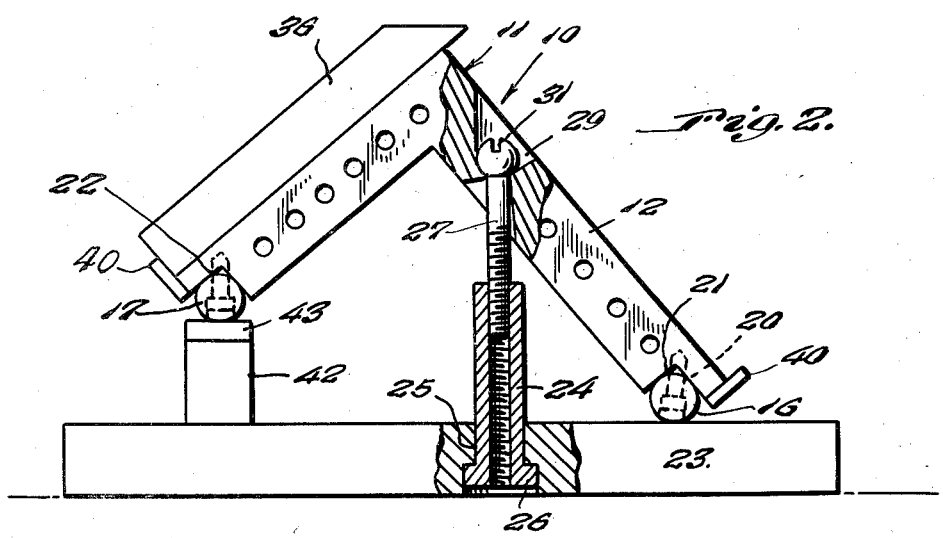
Inventor
Carl Adler
By Clarence A. O'Brien
and Harvey B. Jacobson
Attorneys Aug. 24, 1948.　　　　C. ADLER　　　　2,447,889
SINE ANGLE PLATE
Filed Jan. 31, 1945　　　　2 Sheets-Sheet 2
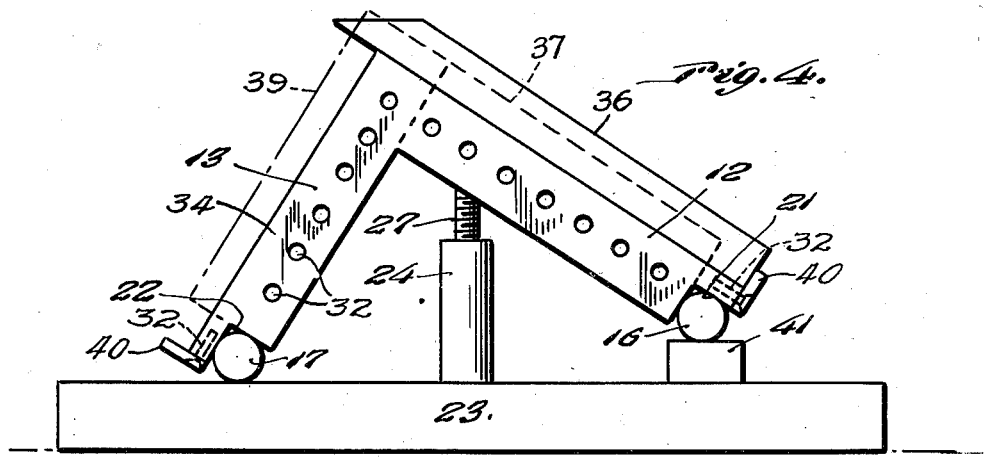
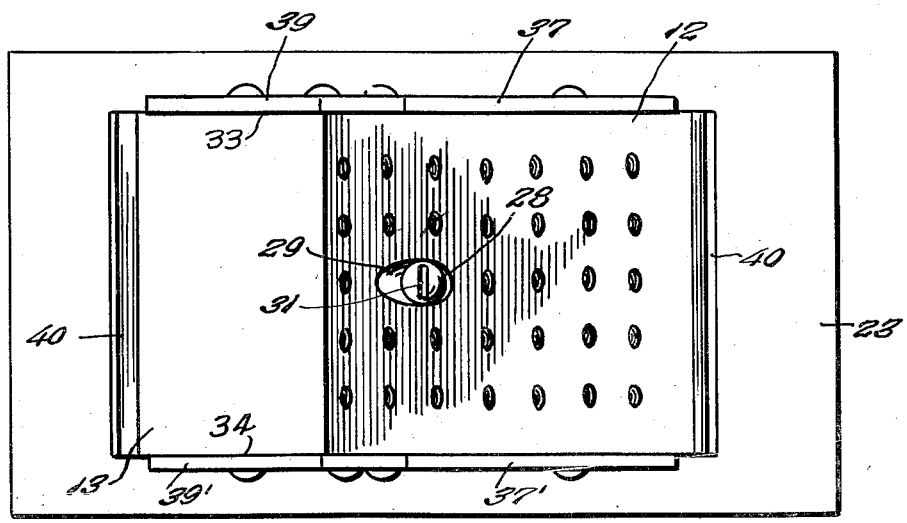
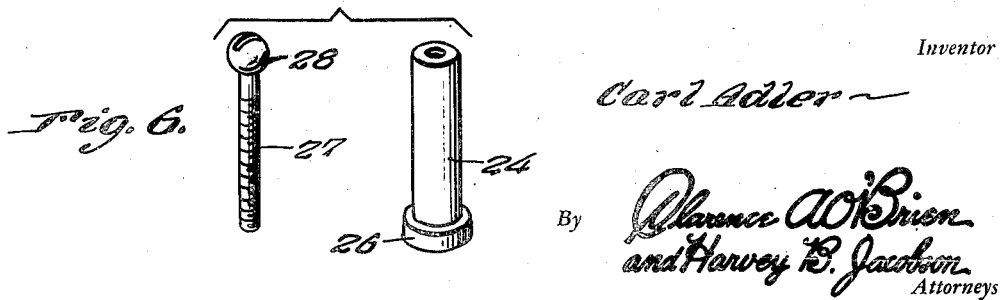
Inventor
Carl Adler
By Clarence A. O'Brien
and Harvey B. Jacobson
Attorneys Patented Aug. 24, 1948

2,447,889

UNITED STATES PATENT OFFICE 2,447,889

SINE ANGLE PLATE

Carl Adler, Wickliffe, Ohio

Application January 31, 1945, Serial No. 575,402

3 Claims. (Cl. 33—174)

This invention relates to tool grinding and has for its object to provide means whereby accurate angles may be had in the grinding of tools.

Another object of the invention is to provide an adjustable sine angle plate for checking the angle of tools being ground. Another object of the invention is to provide a combination angle gauge and tool holder.

A further object of the invention is to provide an L-plate angle gauge and a sine plate base upon which the L-member may be held in inverted position together with means whereby the angular position of the plate may be adjusted.

Another object of the device is to provide an adjustable angle plate so formed that two set-ups are provided with each adjustment.

Other features and advantages will become more readily apparent from the following description and the accompanying illustrative drawings in which:

Figure 1 is an elevational view of my sine angle plate,

Figure 2 is a side elevational view of the device shown in operating position and partly in section, Figure 3 is a detail perspective view of a ground roll, Figure 4 is a side elevational view with two of the work locating plates removed, illustrating another operative position, Figure 5 is a top plan view thereof, and Figure 6 is a detail perspective view of adjusting elements.

In the accompanying drawings as above enumerated and in the following specification, like characters of reference indicate like parts throughout and in which: 10 indicates my sine angle plate which includes an angle plate 11, consisting of the right angularly connected plane plates 12 and 13, each having their free edges 14 and 15, cut in to form right angular seats for accurately ground rolls 16 and 17, of equal dimensions, said rolls being provided with spaced bores 18 and 19, extending there-through to receive bolts 20 (shown dotted), whereby the rolls are held to their seats 21 and 22, the heads of said bolts being countersunk into the rolls.

Into a horizontal base, or sine plate 23, is fixed an internally threaded tube 24, which projects through a bore 25, in said plate 23, the flange 26 of which tube is countersunk into the body of said plate. Threaded into the tube 24, is a screw bolt 27, terminating at its upper end in a ball head 28, seating in a socket 29, opening in the outer surface 30, of plate 12, whereby the member 11, is secured in adjusted position to plate 23.

The head 28, is provided with a slot 31, to receive a suitable tool for tightening or loosening the screw. Tapped bores 32, are provided along the edges 33, 34, in order that work locating stops or plates 37', 37, 39', 39, and 40 may be attached to the device when and where required to hold work, represented as a tool bit 36, in place on the sine angle plate.

In adjusting the device to obtain any desired angle, gauge blocks 41, 42 and 43, may be seated under either of the rolls 16 or 17, according to a particular adjustment required.

As shown in Figure 1, the member 12 forms a sine angle plate or ordinary 90° angle plate. It is also to be noted the set-up illustrated in Figure 2, is for grinding. For ordinary checking of angles it is only necessary to place gauge blocks in position for a desired angle without use of plate 23, and the locking members 24 and 27.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. In a device of the kind described an L-shaped plate, the terminals of each end of which are provided with rabbeted seats, rolls fixedly mounted on each of said seats, a base plate upon which the L-shaped plate is mounted, one face of said L-shaped plate being formed with a countersunk opening therethrough, said base plate being formed with a countersunk opening therethrough, adjustable means comprising a link having threaded telescopically associated parts engageable through said openings for fixing the plates together, gauge block means clamped between one of said rolls and said base plate, and work locating plates attachable to the sides and ends of the L-shaped plate, said L-shaped plate having tapped bores on the sides and ends to receive screws for attaching said plates.

2. In a device of the kind described an L-shaped plate, the terminals of each end of which are provided with rabbeted seats, rolls fixedly mounted on each of said seats, a base plate upon which the L-shaped plate is mounted, one face of said L-shaped plate being formed with a countersunk opening therethrough, said base plate being formed with a countersunk opening therethrough, adjustable means comprising a link having threaded telescopically associated parts engageable through said openings for fixing the plates together, and gauge block means clamped between one of said rolls and said base plate.

3. In a device of the kind described an L-shaped plate, the terminals of each end of which are provided with rabbeted seats, rolls fixedly mounted on each of said seats, a base plate upon which the L-shaped plate is mounted, one face of said L-shaped plate being formed with a countersunk opening therethrough, said base plate being formed with a countersunk opening therethrough, and adjustable means comprising a link having threaded telescopically associated parts engageable through said openings for fixing the plates together.

CARL ADLER.

REFERENCES CITED

The following references are of record in the file of this patent:

UNITED STATES PATENTS

| Number | Name | Date |
| --- | --- | --- |
| 1,107,789 | Hollandt et al. | Aug. 18, 1914 |
| 1,551,995 | Lovenston | Sept. 1, 1925 |
| 2,325,904 | Brebeck | Aug. 3, 1943 |
| 2,365,436 | Saucier | Dec. 19, 1944 |

FOREIGN PATENTS

| Number | Country | Date |
| --- | --- | --- |
| 591,014 | France | 1926 |